United States Patent
McManus

(10) Patent No.: US 6,412,225 B1
(45) Date of Patent: Jul. 2, 2002

(54) WINDOW ASSEMBLY

(75) Inventor: Armand McManus, Manhattan, CA (US)

(73) Assignee: Hehr International, Los Angeles, CA (US)

(*) Notice: Subject to any disclaimer, the term of this patent is extended or adjusted under 35 U.S.C. 154(b) by 0 days.

(21) Appl. No.: 09/343,879

(22) Filed: Jun. 30, 1999

(51) Int. Cl.[7] ............................................. E05D 15/00
(52) U.S. Cl. ........................................ 49/381; 41/141
(58) Field of Search ...................... 49/324, 381, 400, 49/401, 402, 141, 397, 398, 413; 296/146.15, 201; 52/208, 204.62; 16/225

(56) References Cited

U.S. PATENT DOCUMENTS

| | | | | |
|---|---|---|---|---|
| 3,913,265 A | * | 10/1975 | Ehret et al. | 49/141 |
| 3,927,492 A | * | 12/1975 | Carson | 49/141 |
| 3,942,286 A | * | 3/1976 | Ehret et al. | 49/141 |
| 4,087,940 A | * | 5/1978 | Voegele, Jr. | 49/397 |
| 4,274,190 A | | 6/1981 | Slattery | |
| 4,313,280 A | * | 2/1982 | Ehret et al. | 49/141 |
| 4,635,396 A | * | 1/1987 | Ranz et al. | 49/141 |
| 4,777,699 A | * | 10/1988 | Hill et al. | 16/225 |
| 5,062,248 A | * | 12/1991 | Kunert | 52/208 |
| 5,316,829 A | * | 5/1994 | Cordes et al. | 428/192 |
| 5,551,197 A | * | 9/1996 | Repp et al. | 52/204.62 |
| 5,580,628 A | * | 12/1996 | Cordes et al. | 428/38 |
| 5,620,794 A | * | 4/1997 | Burkart et al. | 428/343 |
| 5,787,643 A | * | 8/1998 | Schmuck | 49/141 |
| 5,809,706 A | * | 9/1998 | Neaux | 52/204.51 |
| 5,893,600 A | * | 4/1999 | McManus | 296/146.16 |
| 5,996,284 A | * | 12/1999 | Freimark et al. | 49/209 |
| 6,123,383 A | * | 9/2000 | Doerflinger et al. | 296/146.16 |

FOREIGN PATENT DOCUMENTS

| | | | | |
|---|---|---|---|---|
| DE | 3428506 | * | 2/1986 | 296/146.15 |
| FR | 2667109 | * | 2/1986 | 296/146.16 |

* cited by examiner

Primary Examiner—Curtis A. Cohen

(57) ABSTRACT

A window assembly for buses and other vehicles in which a frameless window pane is mounted on a smaller mounting frame that provides a marginal portion of the window overhanging and concealing the backframe and bus wall, so that a row of such windows can be mounted in edge-to-edge relation for a streamlined "all glass" look. The mounting frame is Z-shaped in cross-section and joined to the window pane by an adhesive joint formed by double-sided adhesive tape, and the assembly has an egress frame that is hinged along the top to the backframe and secured by quick-release fasteners to the mounting frame. An alternative embodiment has an insulated glass construction in which a laminated pane smaller than the outer window pane is adhesively secured to the inside of the latter by a spacer that seals the insulating air space and supports the laminated pane. The glass mounting frame covers the edges of the laminated pane in the window assembly, and a support gasket is positioned around the laminated pane within the mounting frame to limit displacement of the laminated pane.

14 Claims, 5 Drawing Sheets

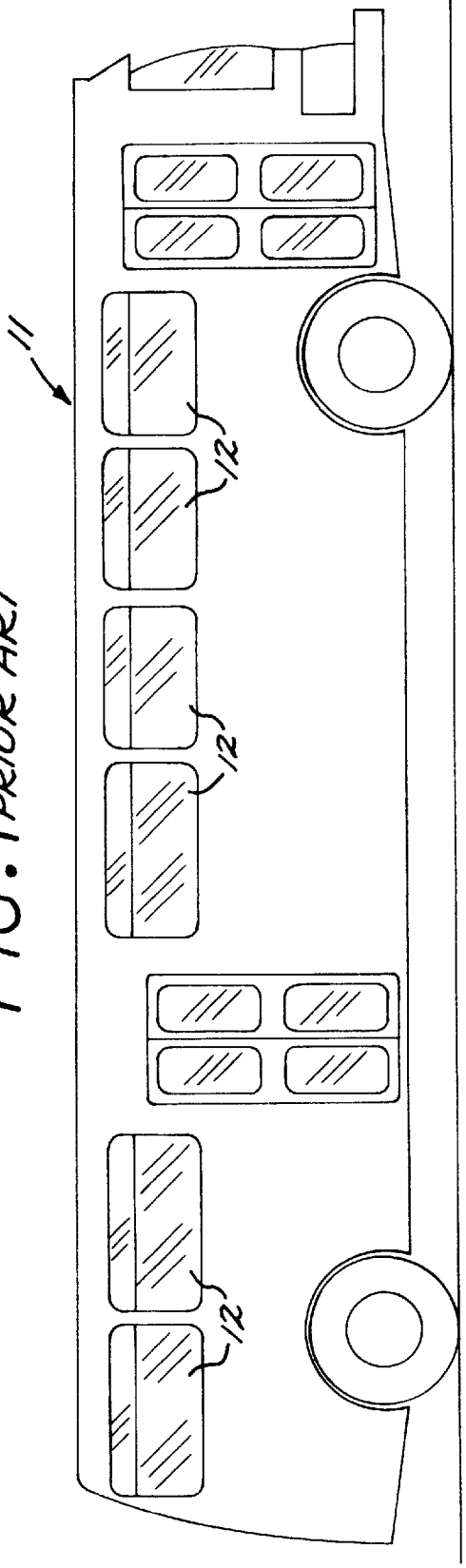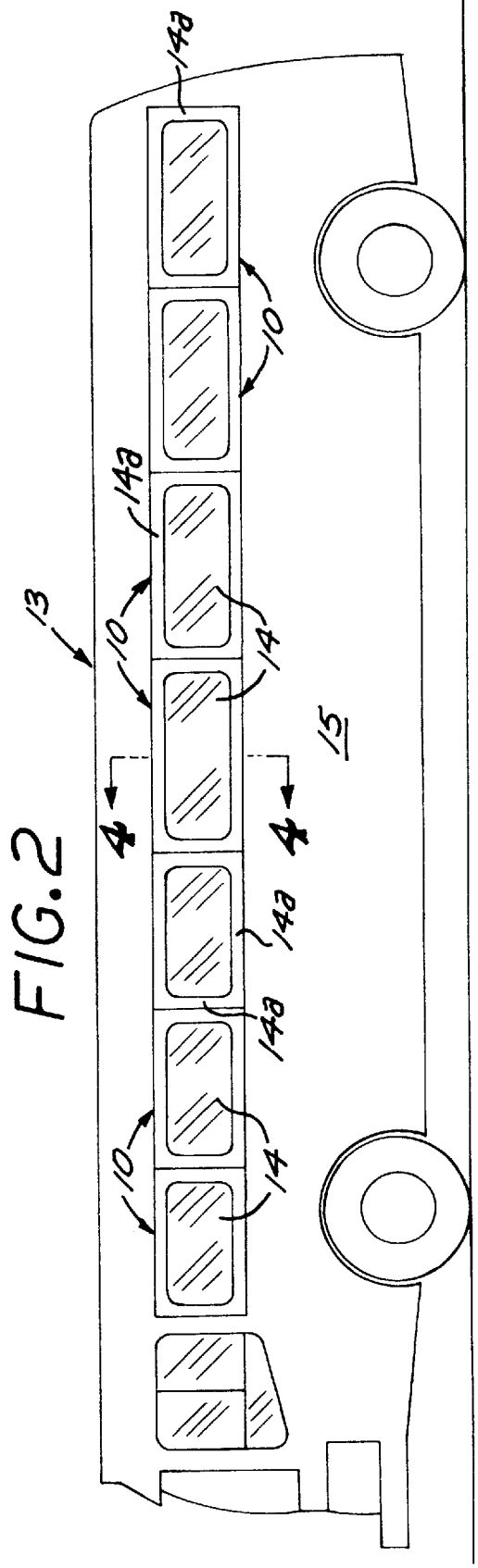

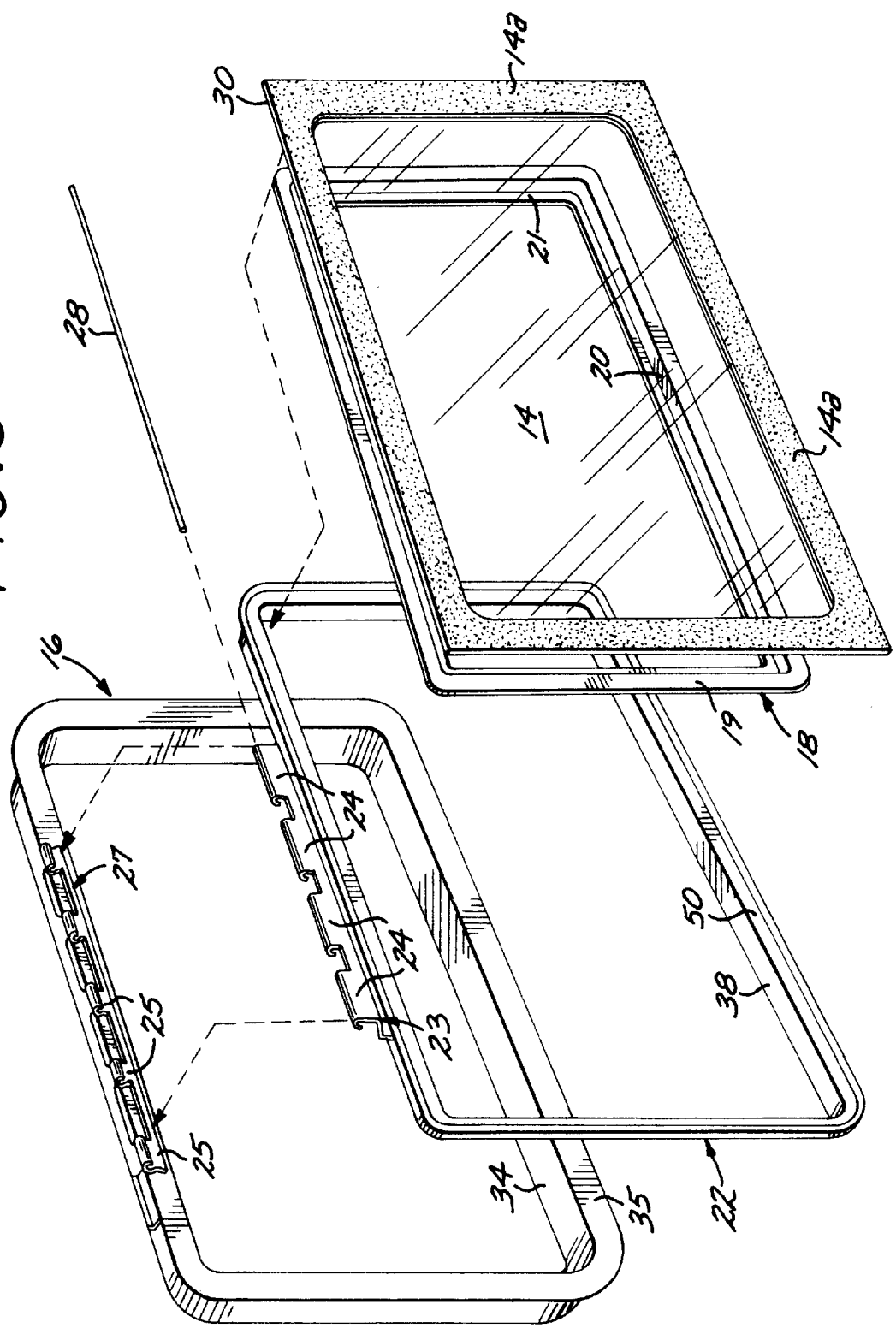

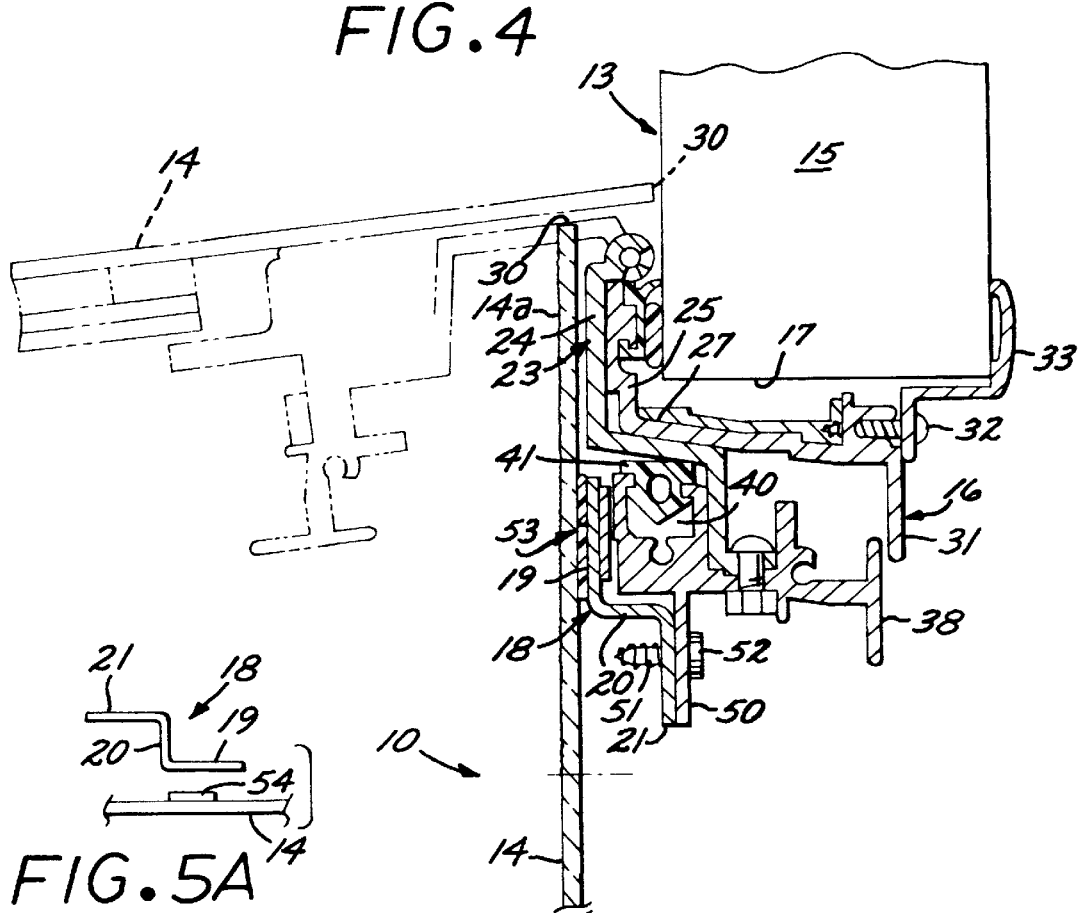
FIG. 4
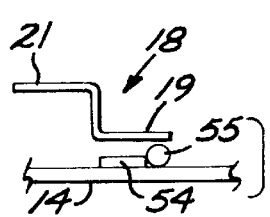
FIG. 5A
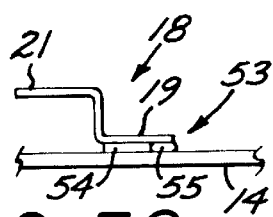
FIG. 5B
FIG. 5C

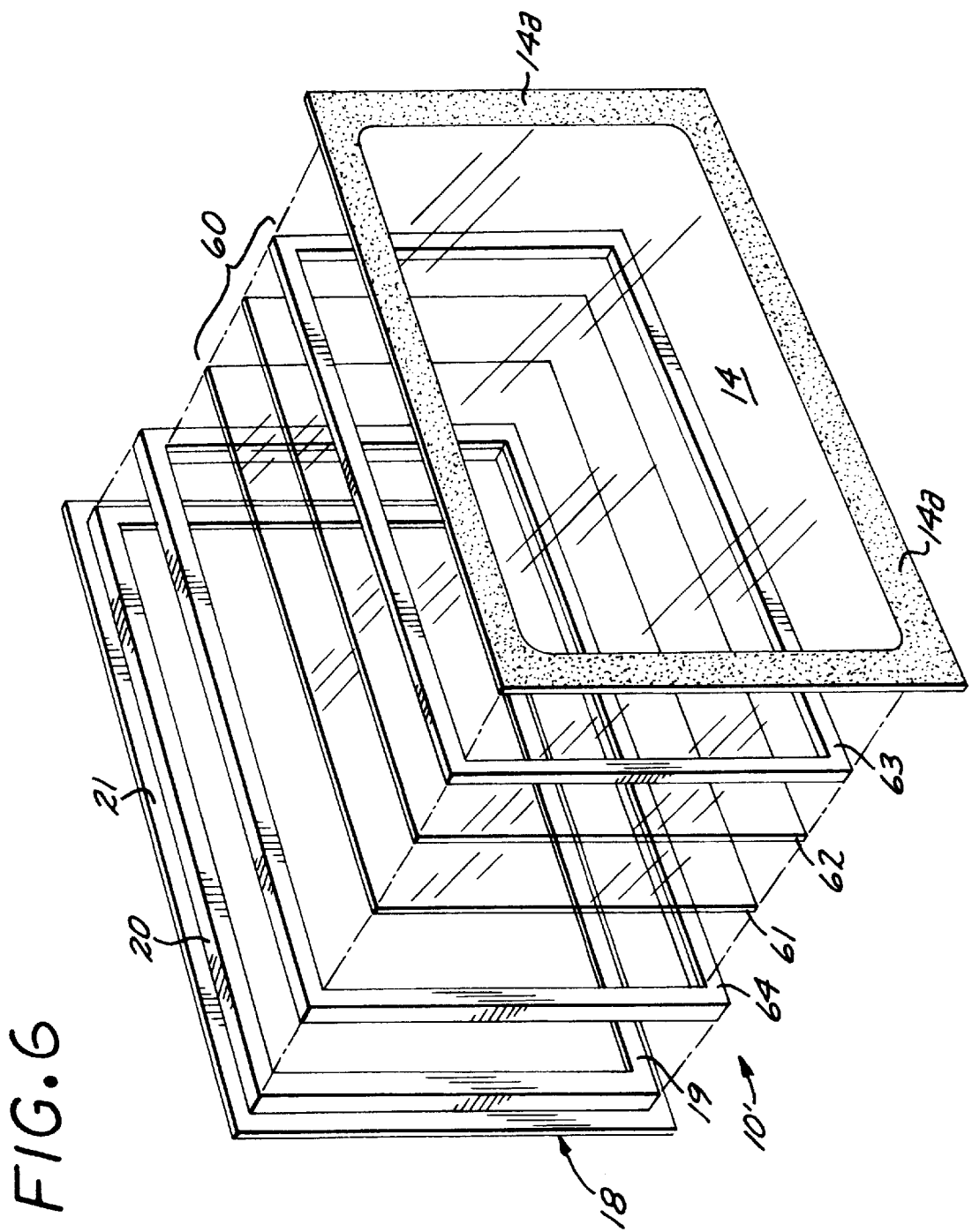

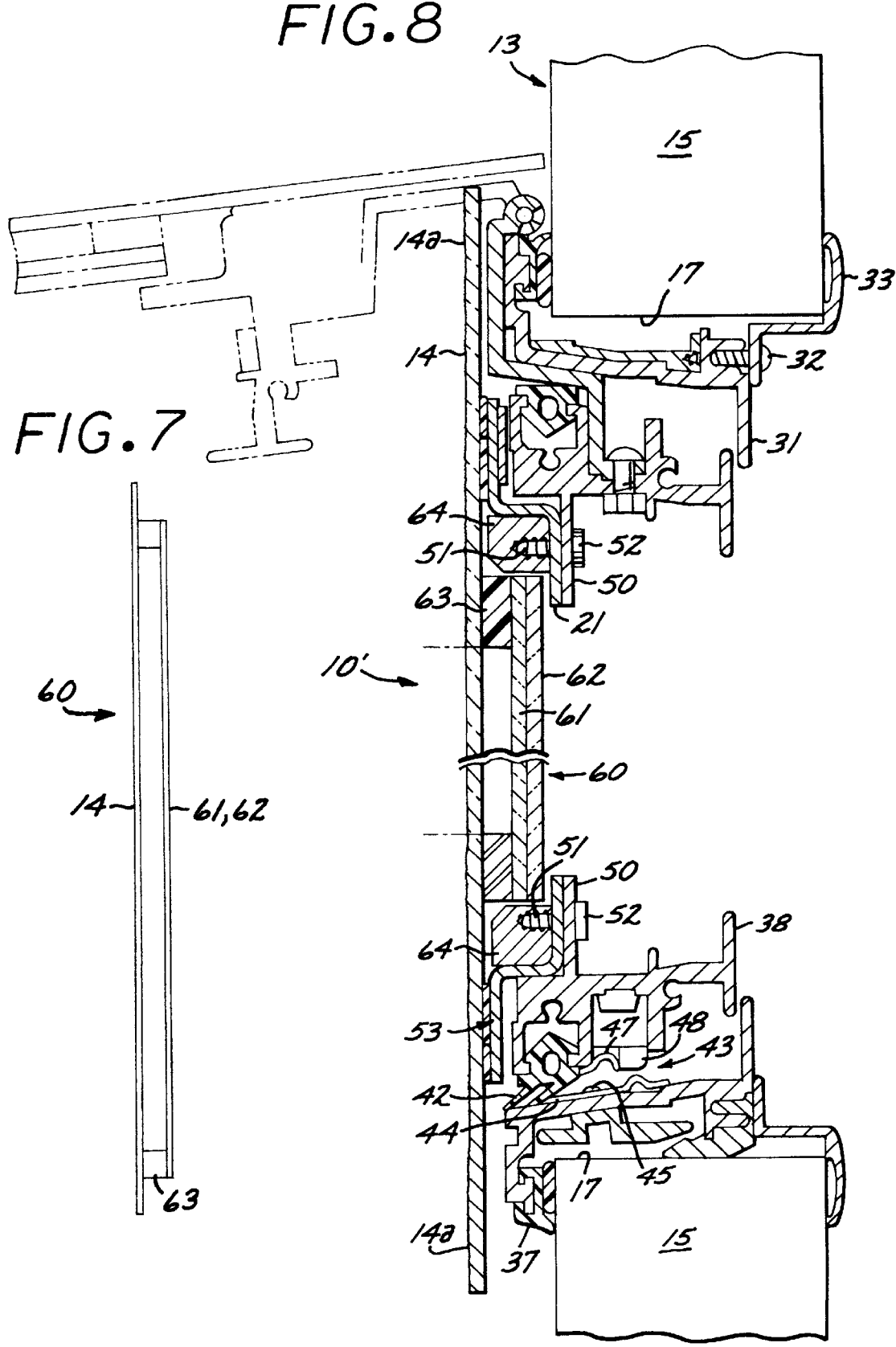

with conventionally framed windows of a well known kind;
WINDOW ASSEMBLY

BACKGROUND OF THE INVENTION

This invention relates to vehicle windows, and relates more particularly to window assemblies that are particularly well suited for use in, but not limited to, buses and similar vehicles, typically having a row of such windows extending along the side of the vehicle beside a row of passenger seats inside the vehicle.

It has been customary in the past to mount glass window panes in frames that surround the panes and secure them in place in longitudinally spaced openings in the sidewall of the vehicle, sometimes with single, fixed panes and at other times with separated portions of the window movably mounted to permit opening of the window for ventilation. It also has been conventional to include in such window assemblies special egress frames that permit opening of the entire window for emergency escape from the vehicle.

Other features that are desirable in such window assemblies include the provision of dual-pane windows for thermal and sound insulation, which has been achieved in a well known manner, and the provision of so-called "flush mount", "frameless" or "all-glass" windows, for a modern, streamlined appearance and perhaps improved aerodynamics in the vehicle. One example of an attempt to convert an older looking vehicle to a more modern look through refurbishing, including window modification, is shown in U.S. Pat. No. 4,274,190. Vehicle and window manufacturers have adopted more sophisticated approaches to this objective, but do not yet seem to have achieved the optimum design for such window assemblies.

SUMMARY OF THE INVENTION

The present invention resides in an improved vehicle window assembly that is apparently frameless so as to be capable of providing an attractive, streamlined all-glass appearance in buses and the like in a novel manner, while mounting the windows securely in the vehicle sidewall, either as a fixed window or as a hinged "egress" window and either as a single-pane or a dual-pane construction. For these purposes, the preferred embodiment of the window assembly comprises a backframe adapted to be set in the vehicle sidewall and defining a window opening, an outside glass pane that is larger than the window opening so as to overhang and cover the backframe around the window opening, and a concealed glass frame smaller than the glass pane and the window opening, the frame being attached to the inner side of the pane, herein by adhesive bonding, and secured to the backframe to hold the pane in place.

For emergency egress, the glass pane is secured to the backframe by means of an egress frame that is interposed between the glass frame and the backframe and movably mounted on the latter, preferably by a concealed hinge, so as to permit emergency opening of the window. The preferred hinge extends along the top edge of the window pane and is formed by hinge elements incorporated in the top edge of the backframe and the top of the egress frame close to the top edge of the window pane and forming a horizontal axis for the window pane along its upper edge.

When a dual-pane insulated construction is desired, an inner insulating pane (which may be a laminated assembly) is spaced inwardly from the outside glass pane and mounted directly on it by a spacer that is adhesively secured to the panes and seals the insulating space between the panes. The preferred glass frame has a special Z-shaped cross-section which provides mounting elements for the window pane, and also covers the interior edges of the glass in the alternative embodiment. A support gasket is disposed in the glass frame around the edges of the insulating glass to prevent excess displacement in use.

Typically, the outside window pane of such an assembly will be tempered transparent glass for safety, and will be tinted to reduce glare and U.V. transmission. Preferably the overhanging border of the window pane will be fritted, printed with a masking pattern or shading, or otherwise treated to reduce transparency and mask the frame components that it covers.

It is to be noted that the special configuration of the insulated glass embodiment of the present invention, while being well suited for use in combination with the apparently frameless outside window pane of the single-pane embodiment of the invention, also has separate utility in other environments. Accordingly, this subcombination is an independent feature of the invention.

Other aspects and advantages of the invention will become apparent from the accompanying drawings and the detailed description, including the details of construction and mounting of the glass frame, the egress frame and the hinge, the insulated glass assembly, and the manner of mounting of the outside glass pane on the glass frame.

BRIEF DESCRIPTION OF THE DRAWINGS

FIG. 1 is a side elevational view of a representative bus provided

FIG. 2 is a view similar to FIG. 1 but showing the other side of the bus with windows in accordance with the present invention providing an "all glass" look;

FIG. 3 is an enlarged exploded perspective view of the principal components of a window in accordance with the present invention as shown in FIG. 2, namely, an outside glass window pane having an inside concealed frame, an egress frame, and a backframe;

FIG. 4 is a greatly enlarged, fragmentary cross-sectional view taken substantially along the line 4—4 of FIG. 2 with the central part removed for compactness and with the open position of part of the window shown in broken lines;

FIG. 5 is a series of views similar to a portion of FIG. 4 showing the steps in applying the adhesive joint;

FIG. 6 is an exploded, somewhat diagrammatic perspective view of the glass and frame elements of an insulated glass alternative embodiment;

FIG. 7 is a side elevational view of the basic insulated glass subcombination of the alternative embodiment; and FIG. 8 is a view similar to FIG. 4 but showing the alternative embodiment with the insulated glass feature.

DETAILED DESCRIPTION OF THE PRESENTLY PREFERRED EMBODIMENT

As shown in the drawings for purposes of illustration, the present invention is incorporated in a window assembly 10 for use in a vehicle such as a bus having a row of windows along its side, FIG. 1 showing one side of a bus 11 with a conventional window configuration 12 and FIG. 2 showing the other side of a bus 13 with window assemblies 10 in accordance with the present invention. The window assemblies 10 provide a streamlined, all-glass look for the bus 13 in which the outside glass window panes 14 are generally in edge-to-edge relation, apparently frameless, and cover the surrounding areas of the bus sidewall 15. While various shapes of windows may be used, the windows in the preferred embodiment are generally rectangular in shape.

As has been explained, it has been customary to mount window assemblies of this general type in openings in the sidewall 15 of the bus and to provide each window assembly 10 with a generally rectangular outside frame 16 (see FIGS. 3 and 4) called a "backframe", that is secured in an opening 17 (FIG. 4) in the bus sidewall. The preferred glass window pane 14 also is generally rectangular, and is at least as large as, and preferably slightly larger than, the associated backframe to entirely cover it in the window assembly. In accordance with a principal feature of the present invention, the glass pane 14 is mounted on a special open, rectangular glass frame 18 (see FIGS. 3 and 4) that is substantially smaller than the pane and lies against its inner side, in spaced relation with the outer edges of the glass frame. The mounting frame lies along a marginal portion 14a of the window pane that extends beyond the window opening and overhangs the surrounding frame and the wall of the bus around the opening. This overhanging portion 14a preferably is "fritted" or otherwise treated to reduce the transparency of the glass and mask the frame elements that lie behind it, thereby contributing to the all-glass look of the vehicle.

As shown most clearly in FIG. 4, the glass frame 18 of the preferred embodiment is formed by a metal bar of generally Z-shaped cross-section that is bent into an open rectangular frame. On each side, the bar has one leg or strip 19 that lies flat against the window pane, a second leg or strip 20 that extends inwardly away from the window pane, and a third leg or strip 21 that lies in a plane generally parallel to the plane of the window pane and to the plane of the first leg 19. The first leg has a flat outer surface that is adhesively bonded to the window pane to secure the glass frame to the window pane, and the third leg is secured to the supporting structure of the window assembly.

When the window is of the "egress" type, as shown in the preferred embodiment herein, the glass frame 18 is supported by a generally rectangular egress frame 22 which is mounted on the backframe 16 to move between open and closed positions. The details of the preferred construction are shown in FIG. 4, wherein it will be seen that the egress frame also is an open rectangular frame, herein in the form of an aluminum extrusion, that fits inside the opening in the backframe 16. The egress frame and the backframe are provided with hinge elements that normally support the egress frame within the backframe 16 in the closed position, shown in full in FIG. 4, and for swinging outwardly from this closed position to an "open" position shown in part in broken lines in FIG. 4. It can be seen most clearly in FIG. 3 that the egress frame 22 has a hinge plate 23 that is secured to its upper side with hinge leaves 24 that extend upwardly across the upper side of the backframe and interfit with hinge leaves 25 on a hinge plate 27 mounted on the backframe. This hinge plate may be formed integrally with the backframe, as part of the extrusion, but herein is shown as a bar that is set into the top side of the backframe. The hinge leaves 24 and 25 have oppositely curled edges that, when aligned, form an elongated hinge sleeve for receiving an elongated hinge pin 28 that joins the two frames pivotally together along a horizontal axis defined by the pin. It will be seen in FIG. 4 that this axis extends along the top of the window pane 14, with the elements 24, 25 and 28 of the hinge lying just below the top edge 30 of the window pane so as to be concealed behind the overhanging margin of the window.

It is usual in this industry to construct the principal frame elements of window assemblies of this general kind of aluminum, which may be extruded in relatively complex shapes and then bent into the desired overall shape. It can be seen in FIGS. 4 and 5 that the representative backframe 16 has an inside flange 31 that defines the inner side of the window opening 17, and receives screws 32 that hold an inside molding 33 in place against the inner side of the wall 15, covering the space between the wall and the backframe entirely around the window opening. The body 34 of the representative backframe extends outwardly to the outer side of the wall 15 and has an outside flange 35 that carries special seals 37 and 38 that engage the outer side of the wall 15. This is only one of many basically conventional backframe configurations that may be used.

Similarly, the representative egress frame 22 is an aluminum extrusion that is bent into generally rectangular shape to support the window pane 14 on the backframe 16. On the inside of the window assembly 10, the egress frame has a flat, inwardly facing flange 38 that overlaps the backframe flange 31 to define the inside outline of the window opening, a contoured body 39 extending outwardly toward the window, and a channel 40 surrounding the egress frame near its outer side and carrying a resiliently flexible seal 41 that engages the surrounding elements of the window assembly. Along the lower side of the egress frame, the seal has flexible fingers or webs 42 that tightly engage the top of the backframe body 34 when the window is in the closed position.

The egress frame 22 normally is held releasably in the closed position shown in full lines in FIG. 4 by a conventional latch, indicated generally by the number 43, comprising a resiliently flexible, V-shaped detent spring having one leg 44 that is secured to the backframe 16 by a rivet 45, a second leg 46 that is inclined upwardly and inwardly toward the egress frame, and having a curved detent 47 on its free end disposed in abutting engagement with a movable lock block 48. The spring normally prevents opening of the egress frame, but the lock block can be moved out of the blocking position shown when the window is to be opened. This is accomplished in a well known fashion with an emergency egress handle (not shown) that is accessible from the inside of the vehicle.

As shown most clearly in FIG. 4, the egress frame 22 has a specially formed rib 50 that extends around the inside of the window opening defined by the egress frame, providing mounting means for attachment of the window pane 14 and its concealed mounting frame 18 to the egress frame and, thus, to the backframe. It can be seen that the outside dimensions of the wall 20 of the mounting frame are slightly smaller than the inner dimensions of the egress frame so that the mounting frame fits into the egress frame from the outer side of the window assembly 10, the left side in FIG. 4, and engages the mounting rib 50 in flat face-to-face contact. The underside of the wall 20 can rest on the upper surface of the lower side of the egress frame, as shown in FIG. 4. It is to be noted that the wall 20 is wide enough to ensure that the window pane is spaced outwardly from the left or outer side of the egress frame. Thus, the window pane does not engage the egress frame 22 or the outer side of the backframe 16.

To hold the window pane 14 securely in this normally closed position, fasteners such as screws 51, having heads 52 on the inside, are inserted through holes in the rib 50 and threaded into the inner frame wall 21. These screws can be removed to disconnect the window pane for service or replacement.

It is important to mount the window pane very securely on the glass frame 18, for to safety and durability in service use.

This is accomplished by forming a very strong adhesive joint 53 between the outer side of the wall 19 of the glass frame and the inner side of the glass itself. In this manner, the Z-shaped configuration of the glass frame 18 provides an outside wall with a flat surface of substantial area for joinder to the glass at the joint 53, which preferably extends continuously around the entire window pane 14. A presently preferred joint is formed by adhesive tape 54, such as that sold by 3M as "3M Double-Sided Tape 4955". This preferably is combined with a bead 55 of sealing adhesive such as the urethane sold under the trademark "Sikaflex 255FC." This is applied around the outside edge of the tape. Before applying such adhesives, it is very important that the surfaces to be joined are thoroughly cleaned, for example, with alcohol. Then the adhesive tape and the "Sikaflex" bead are applied to the glass, and the glass frame is pressed tightly against the tape. Fifteen PSI is a suitable pressure level. It is to be understood, however, that other adhesives may be used to form the joint 53.

Joined to the window pane 14 in this manner, the glass frame 18 securely supports the window pane on the main supporting structure of the window assembly—the egress frame 22 and the backframe 16. It can be assembled quickly and relatively easily into the window assembly 10 by inserting the window frame into the outer side of the egress frame, drilling holes in the mounting rib 50 for the screws 51, and fastening the glass frame and the egress frame together. In normal service, the window assembly remains in the position shown in full lines in FIG. 4, with the outer marginal portions of the window pane extending beyond the frame elements both vertically and horizontally, thereby giving the windows of the bus the desired, streamlined "all glass" look shown in FIG. 2. The adjacent vertical edges of adjacent window panes 14 preferably are in edge-to-edge, slightly spaced relation. With the overhanging portions 14*a* "fritted" to reduce transparency, the frame elements behind the glass are effectively concealed.

At the same time, the window pane 14 can be readily opened for emergency escape from the vehicle, by releasing the detent latch 43 and pushing the lower edge outward to swing the window pane to the open position about the hinge pin 28. It is to be noted that this conventional egress function has been incorporated, according to the present invention, in a window that has the appearance of being frameless and "all glass."

Moreover, the mounting structure of the present invention makes possible the relatively easy removal of the glass pane 14 and its concealed frame 18 by means of the easily removed screw fasteners 51. The result is a highly practical as well as highly attractive window construction.

Description of Alternative Embodiment (FIGS. 6–8)

Shown in FIGS. 6, 7 and 8 is an alternative embodiment of the invention which incorporates an insulated glass subassembly in a window assembly 10' that otherwise may be substantially the same as the window embodiment 10 shown in FIGS. 1 through 5. For simplicity of description, the parts that are identical in these figures are shown with the same reference numbers used in FIGS. 1 through 5, and their description is not repeated.

The important difference in this embodiment is the incorporation of an insulated glass subassembly 60 (FIGS. 7 and 8) in a manner that is readily accepted by the concealed glass frame 18, and which permits the inner pane or panes of the insulated glass subassembly to be smaller than the outside window pane 14. This is accomplished by sizing the inner pane (in this case a laminated double pane 61 and 62, as shown) to fit within the glass frame 18, and to be bonded to the inner side of the window pane by a spacer 63 that forms a sealed, insulating air space between the outside pane 14 and the laminated inside panes 61, 62. In this manner, the laminated inside panes are effectively covered and protected by the mounting flanges 21 and 50 (FIG. 8) which overhang and cover the edges of the laminated pane in the window assembly 10'. A support gasket 64 preferably is secured to the glass frame around the periphery of the laminated pane. This prevents any significant displacement of the insulating pane.

FIG. 6 shows, in separated form, the various layers of the framed construction incorporated in the insulated window assembly shown in FIG. 8. From the right, these are: the relatively large outside glass pane 14 with fritted overhanging marginal area 14*a*; the insulating spacer 63; the two laminated layers 61 and 62 of insulating glass; the gasket 64; and the glass frame 18 that receives and surrounds the insulating glass 61, 62 with its outer wall 19 that is bonded to the overhang 14*a* of the window pane 14 by the joint 53 (not shown).

Shown in FIG. 7 is a simplified view of the insulated window subassembly, in smaller scale to show the entire outer pane 14 and inner pane 61, 62 (shown as a single layer) in proportion. This subassembly is designed for use in combination with the mounting frame 18, but may be used in other circumstances as well. An important feature of this subassembly is the use of a spacer 63 not only to hold the panes apart and form the insulating air space between them, but also to mount the inner insulating panes 61 and 62 on the outer pane 14. The preferred spacer/seal for this purpose is that sold by Edgetech under the trademark "Superspacer," which is a foam gasket with pre-applied pressure-sensitive acrylic adhesive.

From the foregoing, it will be seen that the present invention provides a novel window assembly for use in vehicles such as buses, in which apparently frameless glass windows may be mounted in edge-to-edge relation to provide a streamlined, all-glass look to the vehicle. At the same time, the window assembly may incorporate an emergency egress feature and/or an insulated glass feature, to suit the needs and wishes of the vehicle manufacturer. In addition, the insulated glass subassembly can be used in other combinations as well.

It also will be evident that, while preferred embodiments of the invention have been illustrated and described, various modifications and changes may be made by those skilled in the art without departing from the spirit and scope of the invention.

I claim as my invention:

1. A vehicle window assembly for use in an opening in an upright vehicle wall, said window assembly having, in combination:

a backframe adapted to be mounted in the opening in the vehicle wall and defining a generally rectangular window opening of predetermined size, said backframe having an upper side for extending along the top of the window opening;

a generally rectangular egress frame smaller than said backframe to be disposed generally in said window opening and having an upper side extending along the upper side of the backframe;

hinge elements on said upper sides mounting said egress frame for swinging away from the window opening to an open position;

a generally rectangular window pane having unframed peripheral edges, said window pane overlying one side of said backframe and being at least as large as the backframe so as to entirely cover the same;

a generally rectangular mounting frame circumferentially smaller than said window pane disposed against the window pane between the latter and said egress frame, and providing a marginal portion of the window pane around the mounting frame, said mounting frame being positioned on said window pane to lie alongside the egress frame and to be spaced from all of the edges of the window pane;

an adhesive joint between said mounting frame and said window pane, securing the window pane to the mounting frame;

and means securing said mounting frame to said egress frame, thereby to mount the window pane on the backframe through the egress frame to be hold normally in a closed position covering the backframe, the egress frame and the mounting frame and to be swingable into an open position with the egress frame, said means being releasable to release said mounting frame from the egress frame for replacement and service.

2. A vehicle window assembly as defined in claim 1 wherein the marginal portion of said window pane covers the backframe and the mounting frame is fritted to conceal the backframe and the mounting frame from outside view.

3. A vehicle window assembly as defined in claim 1 wherein said mounting frame has a flat surface adjacent the inner side of said window pane, and said adhesive joint comprises a double-sided adhesive tape disposed between said window pane and said flat surface.

4. A vehicle window assembly as defined in claim 3 wherein the sides of said mounting frame are of generally Z-shaped cross-section, each having a first strip lying in a first plane along the window pane and having said flat surface on one side, a second strip extending inwardly from the first strip, and a third strip disposed in a second plane generally parallel to the first plane.

5. A vehicle window assembly as defied in claim 4 wherein said third strips of the mounting frame abut against said egress frame and are releasably secured thereto by said means securing said mounting frame to said egress frame.

6. A vehicle window assembly as defined in claim 4 further including at least one insulating pane spaced inwardly from said window pane, said insulating pane being generally rectangular in shape and smaller in size than said window pane and said mounting frame;

and a spacer disposed between the marginal portions of said insulating pane and said window pane and adhesively secured to both to support the insulating pane and provide a sealed air space between the panes;

said insulating pane having edges that are covered by said third strips of said mounting frame.

7. A vehicle window assembly as defined in claim 6 further including a support gasket surrounding said insulating pane and fitted into said mounting frame to prevent substantial displacement of said insulating pane.

8. In combination with a vehicle having an upright wall formed with a window opening of preselected size and shape, a vehicle window assembly having, in combination:

a window pane larger than said preselected size and shaped to overlie and cover said window opening, said window pane having unframed free peripheral edges overlying said wall;

a mounting frame for said window pane positioned alongside one side of the window pane, said mounting frame being circumferentially smaller than said window pane and spaced from said peripheral edges to provide marginal portions of the pane extending beyond the mounting frame to overlie and cover portions of the wall;

an adhesive joint between said mounting frame and said window pane securing the latter to the mounting frame;

and means for mounting said mounting frame hingedly on said wall to hold the window pane in overlying relation with the opening and the covered portions of the wall and for swinging away from the backframe into an egress position.

9. The combination defined in claim 8 wherein said means comprise a backframe mounted in said window opening and secured to said wall, and means forming a hinge between said backframe and said mounting frame and thereby supporting said window pane for swinging to an open position.

10. The combination defined in claim 8 wherein said window pane has marginal portions that are treated to reduce visibility of the wall and the mounting frame through the window pane.

11. In a vehicle window assembly for use in an opening in a vehicle wall, the combination of:

a window pane having unframed, free peripheral edges;

a backframe for said window assembly adapted to be mounted in the opening in the vehicle wall and defining a window opening in the backframe, said window pane having peripheral portions circumferentially larger than said window opening and overlying and covering said backframe;

an egress frame disposed between said backframe and said window pane and entirely covered by the window pane;

means movably mounting said egress frame on said backframe for movement away from the backframe into an egress position;

said egress frame having thereon a concealed mounting element circumferentially smaller than the window pane and including a mounting surface extending around the window pane along said peripheral positions in spaced relation with the edges of the window pane, to be entirely covered thereby;

and an adhesive joint between said mounting surface and said window pane whereby the window pane is secured to the egress frame through said mounting element.

12. The combination defined in claim 11 wherein said mounting element is a continuous frame bar having a flat side forming said mounting surface.

13. The combination defined in claim 11 wherein said mounting element is a mounting frame adjacent to said egress frame and secured thereto by fasteners.

14. The combination defined in claim 11 wherein said said peripheral portions of said window pane are treated to conceal the backframe, the egress frame, and said mounting element.

\* \* \* \* \*